United States Statutory Invention Registration [19]

[11] Reg. Number: H914

Leonard et al. [43] Published: May 7, 1991

[54] APPARATUS FOR SUPPORTING CONTACTORS USED IN EXTRACTING NUCLEAR MATERIALS FROM LIQUIDS

[75] Inventors: Ralph A. Leonard, River Forest; Robert C. Frank, Crestwood, both of Ill.

[73] Assignee: The United States of America as represented by the United States Department of Energy, Washington, D.C.

[21] Appl. No.: 260,751

[22] Filed: Oct. 21, 1988

[51] Int. Cl.[5] ..... G21G 1/00

[52] U.S. Cl. ..... 422/159; 422/903

*Primary Examiner*—John F. Terapane
*Assistant Examiner*—Philip Tucker
*Attorney, Agent, or Firm*—Hugh W. Glenn; Robert J. Fisher; Judson R. Hightower

[57] ABSTRACT

Apparatus is provided for supporting one or more contactor stages used to remove radioactive materials from aqueous solutions. The contactor stages include a housing having an internal rotor, a motor secured to the top of the housing for rotating the rotor, and a drain in the bottom of the housing. The support apparatus includes two or more vertical members each secured to a ground support that is horizontal and perpendicular to the frame member, and a horizontally disposed frame member. The frame member may be any suitable shape, but is preferably a rectangular tube having substantially flat, spaced top and bottom surfaces separated by substantially vertical side surfaces. The top and bottom surfaces each have an opening through which the contactor housing is secured so that the motor is above the frame and the drain is below the frame during use.

7 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR SUPPORTING CONTACTORS USED IN EXTRACTING NUCLEAR MATERIALS FROM LIQUIDS

CONTRACTUAL ORIGIN OF THE INVENTION

The U.S. Government has rights to this invention pursuant to Contract No. W-31-109-ENG-38 with the U.S. Department of Energy.

BACKGROUND OF THE INVENTION

This invention relates to improved apparatus for supporting contactors used in extracting nuclear materials from liquids, and more particularly, to box beam support frames for contactors used for liquid extraction involving nuclear materials.

Contactors are centrifugal devices used to extract nuclear materials from liquid solutions. They generally include a housing in which aqueous radioactive materials which include nuclear waste such as transuranic elements (TRUs) are mixed with an organic solvent. The organic solvent extracts the TRUs from the aqueous phase as the two phases are mixed. The two phases are then separated by centrifugal force and removed through separate exit ports. Centrifugal force is created by a rotor in the housing and a motor secured to the top of the housing.

Typically, aqueous radioactive waste is processed through a series of contactor stages arranged in a row. The apparatus is isolated to contain radioactivity, and is operated and maintained with mechanical devices such as robotic arms. In known apparatus, the contactors are supported by an L-shaped beam secured near the top of the contactor housing. The beam is supported by vertical posts located both behind the contactor and in front of it. Interconnect pipes through which the liquids flow from one contactor to another bend around the outside of the posts.

In order to have sufficient stability with the known design, the posts must be relatively short. A problem with using short posts is that the drain in the bottom of the contactor is then rather close to the ground surface, and is relatively difficult to access. If the posts are made much longer, they become susceptible to unacceptable vibrations. The longer posts cannot be made significantly thicker, however, without interfering with the interconnect pipes.

Moreover, the known support system is inconvenient to use because the front posts limit access t a drain valve in the bottom of each contactor stage and other parts of the equipment which must be adjusted by the mechanical devices used to control and maintain the contactors. Thus, there is a need for support systems for contactors which have added stability and improved access for control and maintenance.

Accordingly, one object of this invention is to provide new and improved apparatus for supporting contactors used for separating radioactive materials in aqueous solutions.

Another object is to provide new and improved apparatus for supporting contactors which is sufficiently stable during operation.

Still another object is to provide new and improved apparatus for supporting contactors which permits the contactors to be supported an extended distance from the effective ground surface, for improved access to the drain valves.

Yet another object is to provide new and improved apparatus for supporting contactors which provides improved access to drain valves and other parts of the contactors from at least three sides of the contactors.

SUMMARY OF THE INVENTION

In accordance with one aspect of this invention, apparatus is provided for supporting one or more contactor stages used to separate radioactive materials in aqueous solutions. Each contactor stage has a housing having an internal rotor, a motor secured to the top of the housing for rotating the rotor, and a drain in the bottom of the housing. A plurality of pipes interconnect the contactor stages to each other beneath the motors and in the upper regions of the housings.

The support apparatus includes two or more vertical members secured to a ground support, and a horizontally disposed frame member secured to the tops of the vertical members. The frame member may be any suitable shape, but is preferably a rectangular tube having substantially flat, spaced top and bottom surfaces separated by substantially vertical side surfaces. The top and bottom surfaces each have openings through which the contactor housings are secured so that the interconnect pipes are above the frame and the contactor drains are below the frame during use.

BRIEF DESCRIPTION OF THE DRAWINGS

The above-mentioned and other features of an embodiment of this invention and the manner of obtaining them will become more apparent, and will be best understood by reference to the following description, taken in conjunction with the accompanying drawings in which.

DETAILED DESCRIPTION OF THE PREFERRED EMBODIMENT

Figure 1:
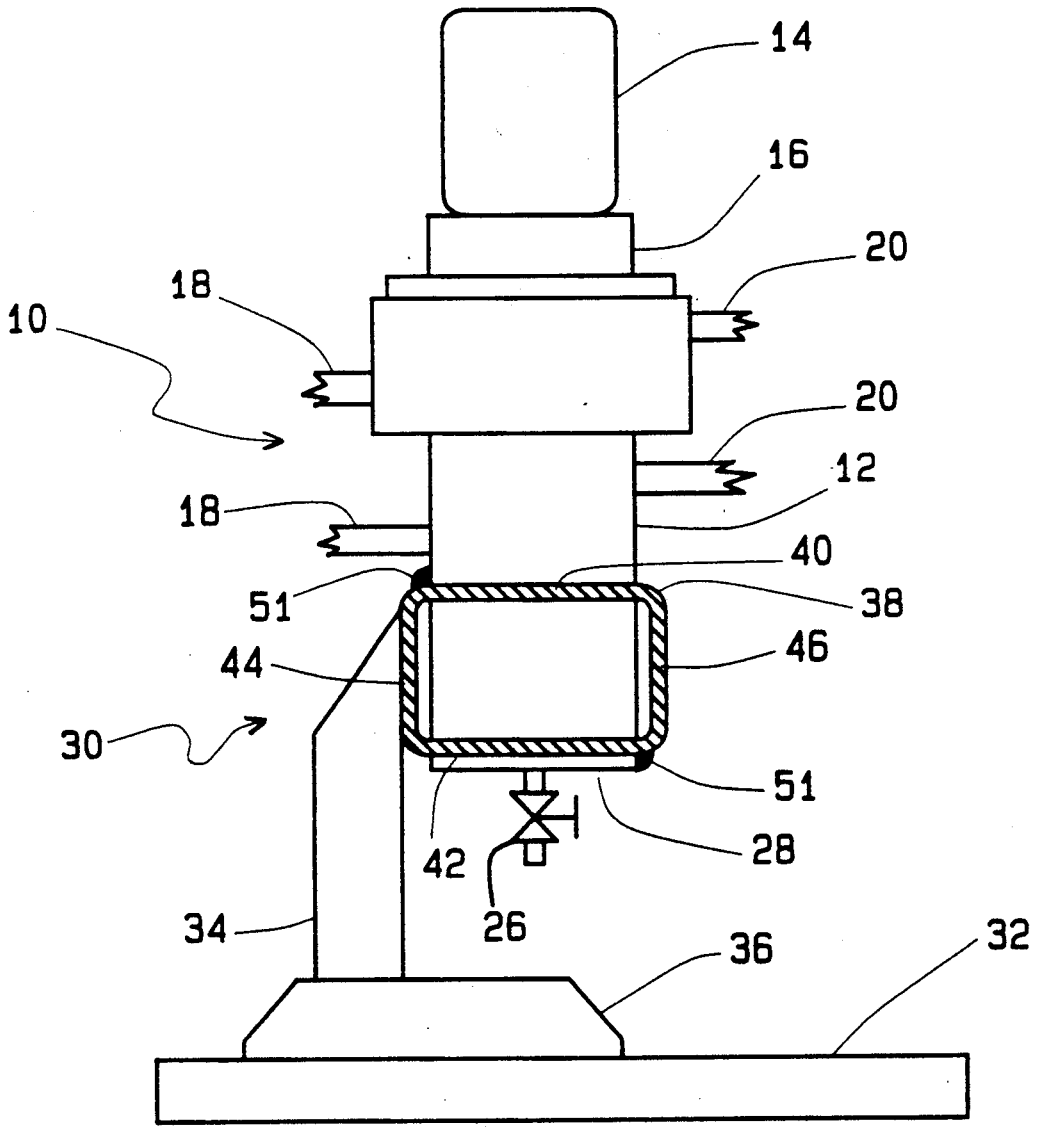
FIG. 1 is a side elevational view of support apparatus made in accordance with an embodiment of this invention, with the frame support shown in cross-section.

As seen in FIG. 1, a contactor stage 10 includes a housing 12, a rotor in the housing 12 (not shown), and a motor 14 secured to a motor mount block 16 and the housing 12. The motor 14 turns the rotor in the housing 12.

The contactor stage 10 includes first interconnect pipes 18 for passing aqueous radioactive materials into and out of the housing 12, and second interconnect pipes 20 for passing an organic liquid into and out of the housing 12. Which side the aqueous phase is on depends on its density relative to the organic phase.

The radioactive and organic solutions are mixed in the housing 12. The organic phase in the mixture extracts specific radioactive elements from the aqueous phase and then the two phases are separated inside the rotor by centrifugal force created by the rotor as it spins in the housing. The separated liquids are then passed through their respective outlet interconnect pipes.

A drain 26 is provided in the bottom 28 of the housing 12. The drain 26 is manually operated, and is provided primarily for maintenance and monitoring purposes.

The contactor stage 10 is supported by apparatus 30. The apparatus 30 includes a footer 32 which rests on the floor or some other suitable surface (not shown) to create an effective ground surface, at least two legs 34 each of which is secured to its footer 32 by any suitable structure, a brace 36 secured to both the leg 34 and the footer 32 for added support, and a frame member 38. The frame 38 is secured to the top of the legs 34.

The frame 38 is generally rectangular in shape, and resembles a box beam. The frame 38 includes substantially flat, spaced top and bottom surfaces 40 and 42, respectively, and substantially vertical side surfaces 44 and 46. It may be made of any suitable material, such as steel or the like, which has sufficient strength and rigidity to remain sufficiently stable during operation of the contactor stage 10. The rectangular shape of the frame 38 provides improved stability over the L-shape beam used in known structures.

The top and bottom surfaces 40 and 42 each include an opening 48, 50, respectively. The housing 12 of the contactor stage 10 fits through the openings 48, 50, and is secured in the frame 38 by any suitable structure, such as bolts or welds 51. Preferably, the housing 12 is secured so that the bottom 28 of the housing 12 is adjacent the bottom 42 of the frame 38. In this manner, the drain 26 is relatively removed from the footer 32.

Figure 3:
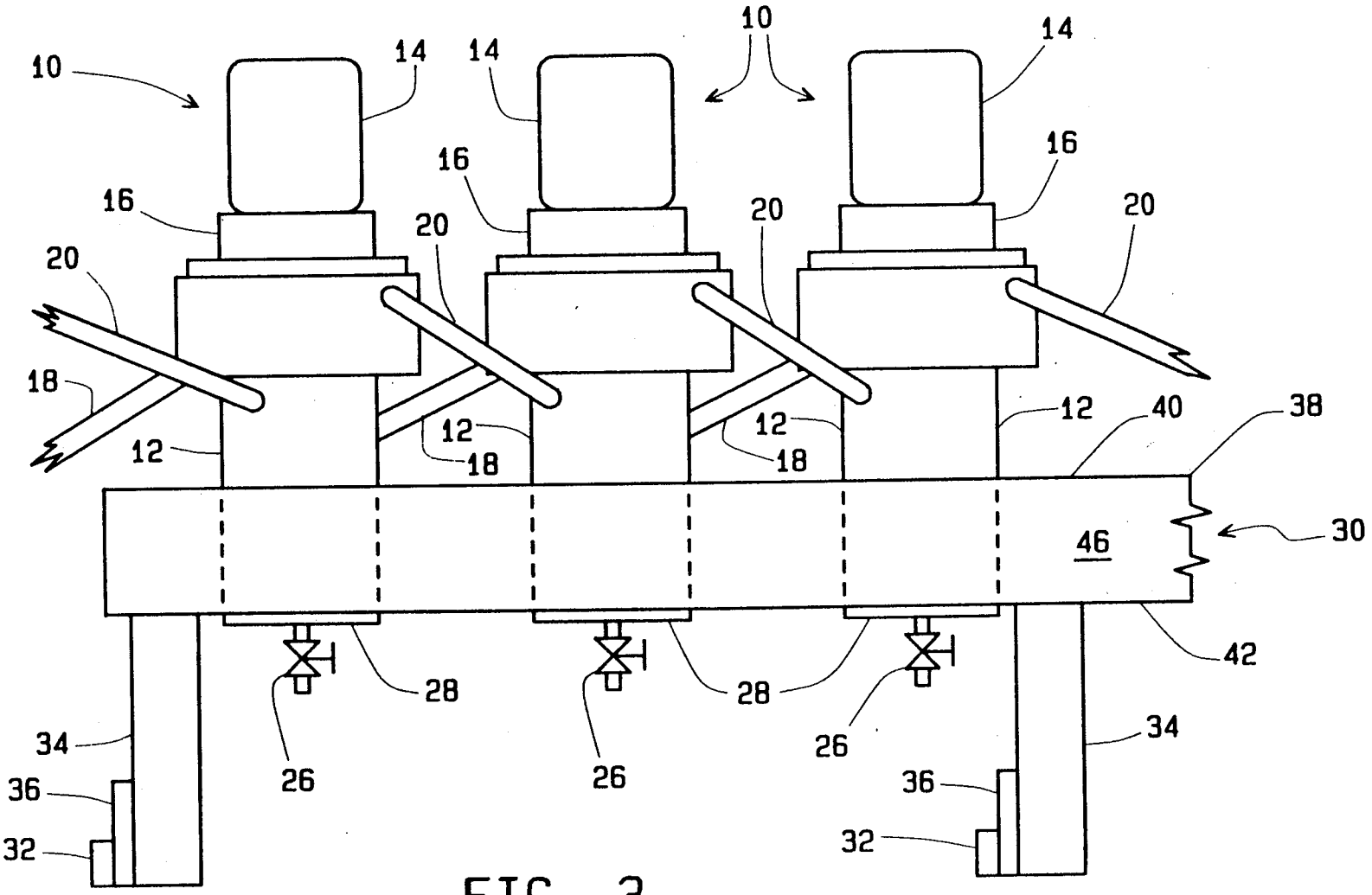
FIG. 3 is a front elevational view of a plurality of contactors supported by an embodiment of the apparatus of this invention.

A plurality of contactor stages 10 may be arranged in a cascade, as seen in FIG. 3. The interconnect pipes 18 (only partially seen in FIG. 3 as they are in back of the contactor stages) and 20 are connected between adjacent contactor stages 10 so that the liquids can flow to the adjacent contactor stage after they are separated in each of the contactor stages 10. The organic and aqueous liquids are passed through the cascade in opposite directions. A plurality of legs 34 are provided as required in the cascade shown in FIG. 3.

Figure 4:
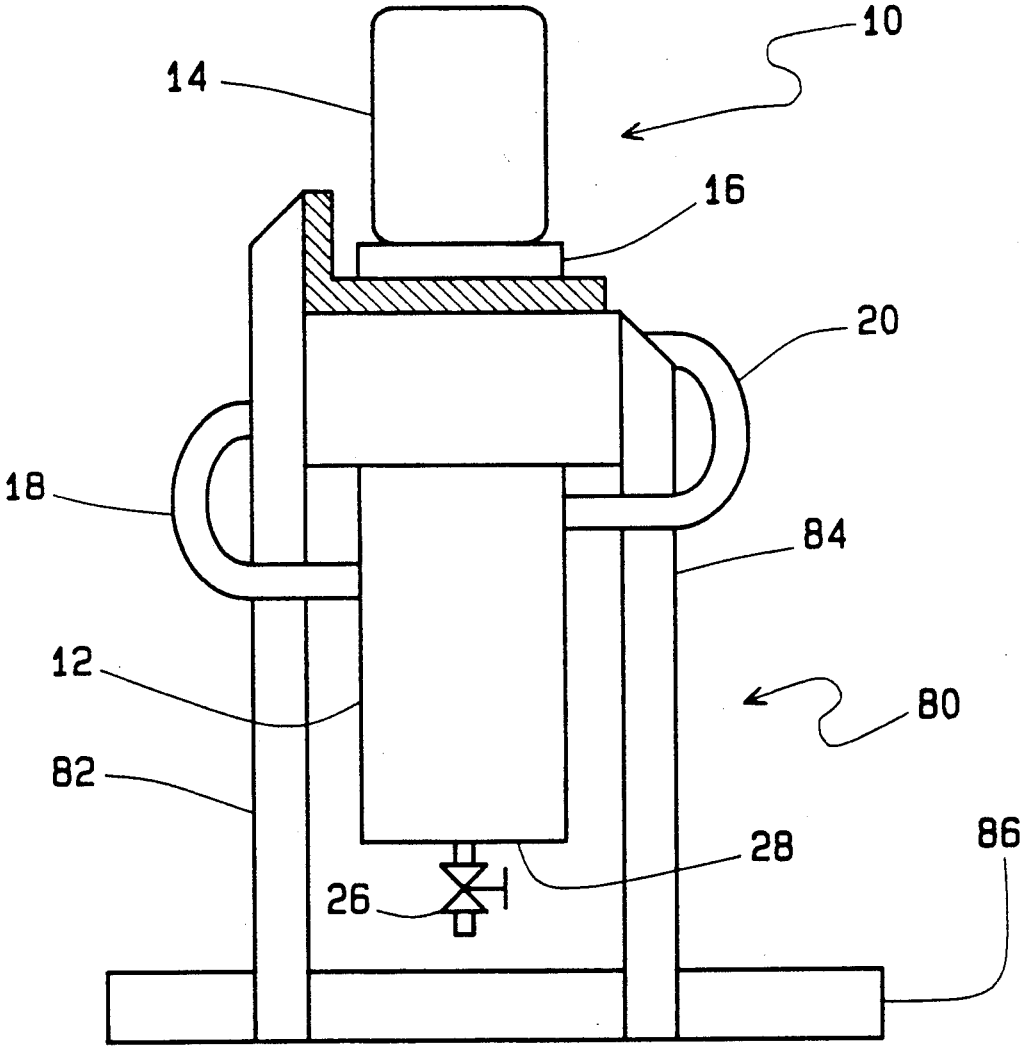
PRIOR ART FIG. 4
FIG. 4 is a side elevational view of a contactor supported by a known structure.

The legs 34 provide easy access to the drains 26 from three sides of the contactor stages 10 in FIG. 3, in contrast to the known support structure shown in FIG. 4. In FIG. 4, a support structure 80 includes back legs 82 and front legs 84. The structure 80 is secured to the to of the contactor 10. If the drain 26 were raised away from the footer 86, the legs 82 and 84 would have to be made longer, which could result in excessive vibration and instability. The thickness of the legs 82 and 84 is limited by the interconnect pipes 18 and 20. As a result, in the known support structure, the drain 26 is relatively close to the footer 86. Access to the drain 26 is further limited by the front legs 84. Thus, mechanical devices which are moved to the drains 26 of successive contactors must be directed around the front legs 84.

Figure 2:
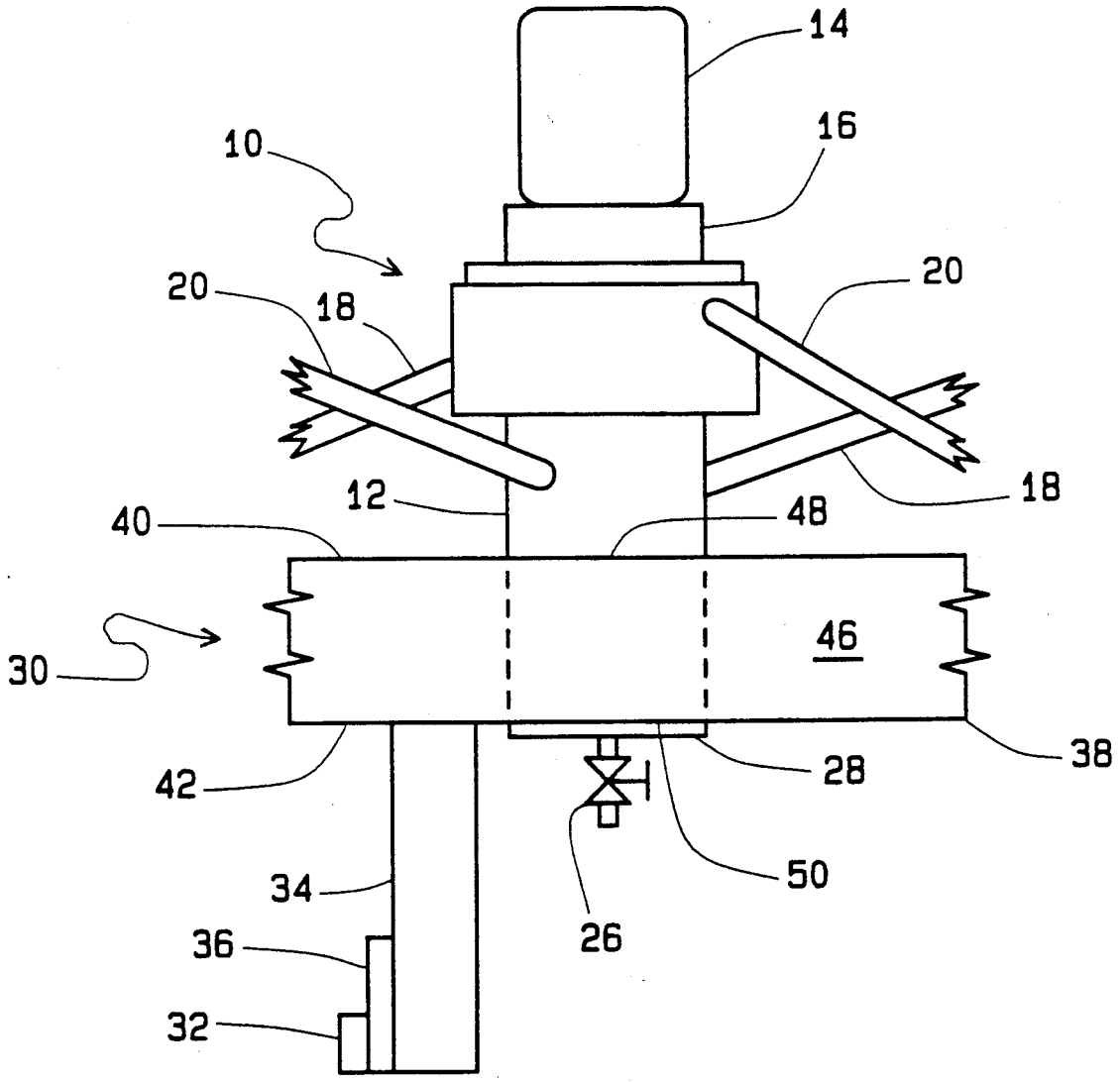
FIG. 2 is a front elevational view of the apparatus of FIG. 1.

In the embodiment of the present invention shown in FIGS. 1, 2 and 3, the housing 12 is secured to the frame 38. The legs 34 are shorter than the legs 82 and 84 in FIG. 4, and do not extend through the interconnect pipes 18 and 20. Accordingly, the legs 34 can be made as large as needed to achieve acceptable stability. Access to the drain 26 is improved because the drain 26 is raised away from the footer 32. In addition, access to the drain 26 is provided on three sides of the drain 26.

In use, the contactor stages 10 can be placed in a suitably isolated area to prevent the undesired escape of radioactivity. The contactor stages 10 can be operated and maintained by mechanical devices, such as robotic arms and the like which, among other things, can place a container under each drain 26 and open the drains 26 to empty the housings 12. Because access to the drains 26 is provided on three sides of the contactor stages 10, such mechanical devices can easily move from one drain 26 to another, regardless of the number of contactor stages 10 which are cascaded in the manner shown in FIG. 3.

The many advantages of the invention are now apparent. Stability is provided by the rectangular frame member. The frame member is shorter than previous support structures, and can be made larger in size than previous support structures, if desired, to provide greater structural support, without being limited in size by the interconnect pipes 18 and 20. Moreover, access to the drains is improved because the drains can be located farther away from the footer 32, and the drains 26 can be reached from three sides of the contactor stages 10, without substantial interference.

While the principles of the invention have been described above in connection with specific apparatus and applications, it is to be understood that this description is made only by way of example and not as a limitation on the scope of the invention.

The embodiments of this invention in which an exclusive property or privilege is claimed are defined as follows:

1. Apparatus for supporting at least one contactor stage for removing radioactive materials from aqueous solutions, the contactor stage having a housing, a rotor in the housing, a motor secured to the top of the housing for turning the rotor, and a drain in the bottom of the housing, said apparatus comprising a tubular, rectangular frame member having substantially flat, spaced top and bottom surfaces separated by substantially vertical side surfaces, said top and bottom surfaces each having an opening through which the housing may be placed, means for supporting said frame without substantially obstructing access to the contactor drain from three sides of the contactor stage, and means for securing said housing to said frame member, whereby the contactor stage is secured in a stable manner without obstructing access to the contactor drain.

2. The apparatus of claim 1 wherein said frame supporting means comprises at least two horizontal footers placed on a ground surface perpendicular to the frame, one vertical leg extending to each footer, and a brace securing each footer to each leg.

3. The apparatus of claim 1 wherein said means for securing said housing comprises a weld.

4. Apparatus for supporting a plurality of contactor stages for removing radioactive materials from aqueous solutions, the contactor stages being arranged in a substantially straight row, each of the contactor stages having a housing, a rotor in the housing, a motor secured to the top of the housing for turning the rotor, a drain in the bottom of the housing, a plurality of first interconnect pipes for placing a first solution containing radioactive materials in the housing and removing solution containing radioactive materials from the housing, and a plurality of second embodiment pipes for placing a second solution containing organic materials in the housing and removing solution containing organic materials from the housing, said apparatus comprising a tubular, rectangular frame member having substantially flat, spaced top and bottom surfaces separated by substantially vertical side surfaces, said top and bottom surfaces each having a separate opening through which each housing may be placed, means for supporting said frame without substantially obstructing access to the contactor drains from three sides of the contactors, and means for securing said housings to said frame member, whereby the contactors are secured in a stable manner without obstructing access to the contactor drains.

5. The apparatus of claim 4 wherein said frame supporting means comprises a series of horizontal footers placed on a ground surface perpendicular to the frame, a vertical leg extending from each of said footers, and a plurality of braces secured to said footers and said legs.

6. The apparatus of claim 5 wherein said legs extend below the first and second interconnect pipes.

7. The apparatus of claim 4 wherein said means for securing said housing comprises a weld.

* * * * *